United States Patent [19]

Valore

[11] 4,188,231
[45] Feb. 12, 1980

[54] METHODS OF PREPARING IRON OXIDE MORTARS OR CEMENTS WITH ADMIXTURES AND THE RESULTING PRODUCTS

[76] Inventor: Rudolph C. Valore, 618 Wyndemere Ave., Ridgewood, N.J. 07450

[21] Appl. No.: 807,598

[22] Filed: Jun. 17, 1977

[51] Int. Cl.$^2$ .............................................. C04B 7/35
[52] U.S. Cl. .......................... 106/90; 106/93; 106/97; 106/98
[58] Field of Search .......... 106/90, 97, 98, 93

[56] References Cited

U.S. PATENT DOCUMENTS

| | | | |
|---|---|---|---|
| 2,279,262 | 4/1942 | Edwards | 106/97 |
| 2,526,674 | 10/1950 | Larsen | 106/97 |
| 2,880,102 | 3/1959 | Woodard et al. | 106/97 |
| 3,232,777 | 2/1966 | Bush | 106/97 |
| 3,357,851 | 12/1967 | Montgomery | 106/97 |
| 3,442,672 | 5/1969 | Kampf | 106/97 |

*Primary Examiner*—James Poer
*Attorney, Agent, or Firm*—Posnack, Roberts, Cohen & Spiecens

[57] ABSTRACT

A mortar or cement composition is provided which is adapted for being mixed with water and thereafter set. The composition comprises cement mixed with iron oxide in a ratio of about 1:4. At least one admixture is added from a group consisting of functional water-reducer admixtures, thickener admixtures and defoamer admixtures. The functional water reducer admixture is used to increase the density of the mortar or cement without substantially retarding the setting thereof and without entraining substantial amounts of air. The defoamer admixture is added to reduce air content of the mortar or concrete and to increase the density thereof. The thickener is adapted to inhibit bleeding of water from the mortar or cement. The method of the invention involves making a mortar or cement composition which comprises adding to cement and iron oxide at least one admixture selected from the group consisting of functional water-reducer, thickener, and defoamer admixtures. The thickener admixture may be added to enhance pumpability of the mortar or concrete and the defoamer admixture is used to compensate for the air entrained by the thickener admixture.

57 Claims, No Drawings

METHODS OF PREPARING IRON OXIDE MORTARS OR CEMENTS WITH ADMIXTURES AND THE RESULTING PRODUCTS

FIELD OF INVENTION

This invention relates to improved mortars and cements and methods of making and using the same.

BACKGROUND

Mortar and cement constitute some of the world's most important building materials. Cement, for example, can be mixed with water and materials such as sand, crushed stone, gravel and so forth to make concrete. The cement and water form a paste or mortar that binds the other materials together as the concrete hardens. Concrete has excellent qualities which make possible the rapid and efficient construction of dams, roads, large buildings and all types of large structures.

Most of the cement used today is portland cement which is a hydraulic cement that hardens under water. This cement is called portland because of a general appearance relationship to the natural product mined on the isle of Portland in Great Britain.

In U.S. Pat. No. 3,645,916 there is disclosed a metallic mortar. This mortar is especially suitable in the making of constructions associated with nuclear power plants and the like. This patent discloses that concrete attenuates both neutrons and gamma rays reasonably well even though the effectiveness thereof varies somewhat with the composition. This patent, moreover, points out that a large number of concrete formulations using various types of aggregates dispersed therethrough have been employed as radiation shielding materials. It is an object of U.S. Pat. No. 3,645,916 to provide an improved metallic mortar which when admixed with water and allowed to set will produce a high density concrete having desirable characteristics and which is free of the disadvantages of the prior art material. To this end U.S. Pat. No. 3,645,916 discloses a metallic mortar which contains an iron ore concentrate characterized by high bulk density and various other characteristics such as, for example, appearance, crystalline corners and flat cleavage planes which in turn results in a radiation shielding structure of low cost, high density, ease of fabrication, good structural properties and so forth.

SUMMARY OF INVENTION

It is an object of the invention to provide improved mortars and cements.

It is another object of the invention to provide improvements over the metallic mortars disclosed in U.S. Pat. No. 3,645,916.

Yet another object of the invention is to provide improved mortars and cements having substantially optimized densities and strengths.

Yet another object of the invention is to provide improved mortars and cements having decreased percentages of entrained air.

Still another object of the invention is to provide improved mortars and cements in which provision is made for the inhibition of the bleeding of water.

Yet another object of the invention is to provide improved mortars and cements having reduced plastic shrinkage and improved pumpability characteristics.

Yet another object of the invention is to provide improved mortars and cements having improved thermal conductivity characteristics.

To achieve the above and other objects of the invention in accordance therewith, there is provided an improved mortar or cement composition adapted for being mixed with water and thereafter set, said composition comprising cement, iron oxide, and at least one of the admixtures from the group consisting of functional water-reducer admixtures, thickener admixtures and defoamer admixtures. The functional water-reducer admixture is provided in order to increase the density of the mortar or cement without substantially retarding the setting thereof and without entraining substantial amounts of air. The defoamer admixture is adapted to reduce air content of the mortar or concrete and to increase the density thereof. The thickener admixture is adapted to inhibit bleeding of water from the mortar or cement.

The iron oxide mentioned above includes a fine aggregate and in addition thereto a coarse aggregate may be added as necessary. The iron oxide may, for example, be present in a ratio of about 4:1 by weight relative to the cement. The functional water-reducer when selectively employed is present in the amount of about 0.2 to 2 percent of cement by weight. The defoamer admixture selectively employed is present in the amount of about 0.01 to 2 percent of the cement by weight. The thickener admixture also selectively employed may be present in the amount of about 0.01 to 2 percent of the cement by weight.

The composition may further comprise a gas forming agent in the amount of, for example, 5 to 100 g. per cu. yd. of mortar or concrete. The composition may further include fly ash.

The functional water-reducer admixture mentioned above may be a water soluble polymer of high molecular weight. The functional water-reducer admixture may furthermore be a formaldehyde condensed salt of beta naphthalene sulfonic acid or melamine sulfonic acid.

The defoamer admixture may advantageously be tributyl phosphate. The defoamer admixture may alternatively be a silicone based defoamer. It may furthermore be selected from the group consisting of dibutyl phthalate, water-insoluble alcohols, and water-insoluble esters of carbonic and boric acids.

The thickener admixture may be selected from the group consisting of soluble cellulose gums, polyethylene oxide, polyacrylamides, guar gum, montmorillonites, bentonite clay, pyrogenic silica, asbestos, mineral fillers and fibers.

The iron ore may preferably be hematite or magnetite and the cement may be preferably portland cement.

According to the method of the invention, there is added at least one admixture selected from the group consisting of functional water-reducer, thickener and defoamer admixtures. The functional water-reducer admixture is selectively added to increase the density of the mortar or cement. The defoamer admixture is added to reduce the air content of the mortar or cement. The thickener admixture is added to inhibit bleeding of water from the mortar or cement.

The thickener admixture may be added to enhance pumpability of the mortar of cement and the defoamer admixture may be used to compensate for air entrained by the thickener admixture.

The above and other objects, features and advantages of the invention will be found in the detailed description which follows hereinafter.

DETAILED DESCRIPTION

In accordance with the invention, functional chemical admixtures are employed to improve the properties and performance of iron oxide mortars and cements. By selective use of admixtures or combinations of admixtures, iron mortar and cement can be vastly improved and, in addition, can be tailor-made for numerous specific requirements.

Using "superplasticizers" of polymer types, water requirements can be reduced up to 30 percent, at workable consistency. Superplasticizers have only recently been marketed and I have now tested them for use in mortar and concrete. These superplasticizers are also known as "superwater reducers," "superfluidifiers," "high range water reducers," and "functional water reducers" to differentiate them from commonly used admixtures which reduce mixing water contents of concrete from 4 up to 10 percent, but which cannot be used in dosages beyond the range of 0.03 to 0.20 percent by weight of cement because the setting times of the cement would be retarded to an impracticable degree, even when compensating accelerating admixtures are also used. These older, commonly used admixtures are typified by lignosulfonates, polysaccharides, and such hydroxylated carboxylic acid salts as the gluconates.

The superplasticizers may be termed "functional" water reducers since they retard the setting of cement only slightly, do not entrain air to an appreciable degree, and attain effectiveness proportional to dosage at levels of 0.30 to 1.50 percent by weight of cement or of cement plus finely divided mineral admixtures such as fly ash. These admixtures which are employed in accordance with the invention are water-soluble polymers of high molecular weight of two main types: formaldehyde condensed salts (sodium, potassium, calcium, or ammonium) of beta naphthalene sulfonic acid, and formaldehyde condensed sodium salts of melamine sulfonic acid. Combinations of these two types can be used.

By sacrificing a part of the water reduction achieved in accordance with the above, consistency of mortar or cement can be increased to a self-leveling state. This greatly aids in the placement and compaction thereof. However, the water reduction is generally preferred since water reduction increases density. An increase in density is desirable in radiation shielding and other applications. Furthermore, strength is increased, potentially up to 75 percent, and thermal conductivity is increased substantially, when a superplasticizer is used.

It is the nature of cement-sand mortars to carry 5 to 15 percent or more of entrained air. This tends to decrease density. However, in accordance with the invention, further density increases are obtained in iron oxide mortars by using defoamers to reduce air content to well under 5 percent. Defoaamers of various types can be used. Tributyl phosphate (TBP) is one of the most effective defoamers for portland cement-water systems. For example, 0.10 percent of TBP, by weight of cement, reduces the air contents of mortars or concretes to less than 4 percent. This is so even in mixtures containing other ingredients which normally increase foaming or air-entraining tendencies during mixing. TBP is, however, a liquid and cannot be preblended with dry-packaged cement-aggregate mortars.

Various silicone-based defoamers, which can be used in accordance with the invention, are available (Nopco Foamaster B, Foamaster NXV) but cause retardation of setting of cement. Other compounds such as dibutyl phthalate, water-insoluble alcohols, and water-insoluble esters of carbonic and boric acids can also be used. Proprietary dry powder formulations are preferred, such as Hodag "HC 352," Nopco "PD-1," Philadelphia Quartz "Quso," and Colloids, Inc. "770DD." Nopco PD-1 has been found particularly effective for iron mortars in amounts ranging from 0.01 to 1.0 percent by weight of cement.

Optimum increases in density are obtained for a given mix by incorporating combinations of superplasticizer-water reducers and defoamers in the mortars. The use of combined admixtures to increase density and reduce porosity produces such substantial increases in strength that avenues are opened to modify cementitious binder-iron oxide aggregate proportions by decreasing the binder content. This further increases density at strength levels well above those of unmodified mortars which may be richer in cementing material. For example, the normal proportions of binder to iron aggregate are 1 to 4 by weight. When the binder content is reduced by 25 percent, the proportions become 1 to 5.33. The latter mixture, incorporating admixtures in accordance with the invention, is heavier than the richer normal mixture. It has a density of 220 lb/cu ft versus 210 lb/cu ft for the normal mixture, and it is stronger. It attains a 7500 psi cube strength at 28 days versus 5000 psi for the normal mixture. The costs of the additives are offset by the reduction in cementitious binder, while density, strength, and thermal conductivity are nevertheless increased as will be hereinafter shown.

This point may be further emphasized. The reducing of the cement content of a normal mortar or concrete reduces density, but when iron oxide "sand" is used, leaner mixes are heavier because of the effects of the comparative specific gravities which are as follows:

3.20 for portland cement (in water)
2.65 for siliceous sand
4.96 for specular hematite (iron oxide)

In concrete containing heavy fine and coarse aggregates, the effect of reducing the cement content is even greater in increasing density. Since it becomes advantageous to use leaner mortar properties, in order to increase density, the use of a water reducer combined with defoamers becomes much preferred in order to maintain strength at a satisfactory level.

It becomes possible, in accordance with the invention, to modify the mortar for special purposes. For example, pumpability can be enhanced along with the necessary virtually complete inhibition of "bleeding" of water from the mortar, by incorporation of a water-soluble thickening agent in the mortar. Examples of such agents are soluble cellulose gums (Natrosol, Methocel, Cellosize), polyethylene oxide (Polyox), polyacrylamides (Cyanamer), guar gum (Jaguar), modified montmorillonites (Bentone, Benagel), bentonite clay, pyrogenic silica (Cabosil, Hysil, Aerosil), silica coated milled asbestos (Calidria), fibers (asbestos, polypropylene), and various other natural and synthetic gums, water-soluble resins, and finely divided mineral fillers and fibers. p Bleeding must be suppressed to prevent plastic shrinkage, so that iron oxide mortar pumped into confined spaces fills the spaces completely after hardening. The use of thickeners is proposed in accordance with the invention to suppress bleeding. However, is occurs as a side effect that thickeners, while inhibiting bleeding, entrain undesirable amounts of air and tend to increase water requirements. Since density and strength are thereby decreased, an optimum pumpable iron oxide mortar requires three admixtures: (a) a thickener-bleeding inhibitor, (b) a water-reducer to compensate for increased water demand due to the thickener, and (c) a defoamer-air detrainer to inhibit the air-entraining action of the thickener.

The thickening agents referred to above inhibit bleeding or segregation of water from a mix. They simultaneously serve as "suspending aids" by reducing the tendency of aggregates in fresh concrete to settle when the consistency of the cement paste or mortar is too thin. Segregation effects, whether of water or of aggregates, are due to gravitational force, and result from differences in specific gravity of the constituents of mortar or concrete. Such segregation is aggravated by movement resulting from pumping or compaction by vibration. It is known that iron oxide fine aggregate, because of its high density, produces a greater tendency for bleeding and aggregate segregation to occur than ordinary sand. In concrete with heavy coarse aggregates, segregation is further aggravated unless the mortar has a substantially higher density than can be provided by ordinary sand, in order to reduce the tendency of the coarse aggregate to settle or sink in the mortar. When the latter occurs the mixture becomes unpumpable and virtually unplaceable. Therefore, while it is necessary to increase mortar density when making concrete with heavy coarse aggregates, it is not sufficient to do so. It is also necessary to provide improved cohesion, thixotropy and consistency in order that heavy aggregate particles, fine and coarse, remain suspended in the mortar and concrete subjected to normal movements associated with transporting, puming, placing, consolidation by vibration, without segregation. The objective is to produce a mortar or concrete that is cohesive and nonsegregating and yet pumpable and workable.

Pumping aids are not usually necessary in properly proportioned concrete with well-graded conventional aggregates and, where these conditions are not met, puming aids usually cannot correct the situation.

With heavy aggregates, the situation is different due to the high density of the aggregates in relation to that of cement paste, and thickener-suspending aid-pumping aids become a virtual necessity.

Since the iron oxide mortar can be tailor-made, in accordance with the invention, to provide specific handling characteristics consistent with modern concrete placement requirements, together with improved properties upon hardening, it becomes an ideal matrix for high-density or high-thermal-conductivity concrete. The concrete is formed simply by adding coarse aggregate to the mortar. A variety of coarse aggregates can be used. For example, quartz, limestone, trap rock (basalt), magnetite, ilmenite, limonite, barite, hematite, or steel punchings, shot, or scrap, in approximate order of increasing density, in maximum sizes ranging from 3/16 to one inch or more, can be added to improved iron oxide mortar to provide concretes of densities of 200 to 210 lb/cu ft (for quartz, limestone, or trap rock coarse aggregates), and up to 350 lb/cu ft (for steel punchings). Alternatively, coarse aggregates can be preplaced ("prepacked") in forms and iron oxide mortar containing the three types of admixtures cited becomes an ideal grout with requisite nonbleeding, water-retaining characteristics and fluidity and pumpability needed for placement by intrusion or injection into the preplaced coarse aggregate voids.

When specific properties are desired, such as thermal conductivity greater than 30 Btu/hr sq ft (deg F./in.) (4.3 W/m deg. C.), advantage may be taken of the high conductivity of the iron oxide mortar to combine it with minerals of high conductivity such as quartz or hematite as coarse aggregate rather than steel, in order to reduce costs.

Finely divided mineral admixtures can be added to iron mortars. Such mineral admixtures include calcium carbonates, ground quartz, magnesite, magnetite, kaolin, kaolinite, ground blast-furnace slags, chromium oxide, ferric oxide color pigments, titanium dioxide, calcium surfate (gypsum, hemihydrate, and anhydrite), and various pozzolanic materials ("Pozzolans") such as fly ash from the burning of powdered coal; ground calcined shale, slate, or clay; volcanic ash and pumice or pumicite, tuff, tripoli, trass, gaize, diatomaceous earth and so forth.

The "pozzolans" as a group and fly ash from bituminous and other coals in particular consist mainly of siliceous and aluminous glassy material. Silica and alumina in reactive form in fly ash react with lime liberated during the hydration of portland cement to enhance cementitious value and long term strength, and to provide increased resistance to sulfate solutions from soil and sea water. Permeability to water is decreased.

The optimum percentage of fly ash in the cementitious binder depends on the chemical composition of the cement, the curing temperature, and the long term exposure temperature of the mortar or concrete. For conventional mortars and concretes cured in a moist condition at ordinary temperature for a short period of time (up to 7 days) and then exposed to air at ordinary temperature, fly ash may be used at 15 to 20 percent replacement levels for Portland cement without undue effect on strength. For curing at temperatures of 120° to 200° F. for less than one day, up to 30 percent of fly ash can be used. At curing temperatures of 300° to 400° F. in saturated steam (in autoclaves) for less than one day, 40 to 60 percent of fly ash is optimum and provides strength higher than that of concrete with 100 percent portland cement binder.

For exposures for long periods at temperatures of 175° to 400° F., as in a primary reactor shield, concretes or mortars with substantial substitution of fly ash for cement are considerably more stable in strength and dimensions than comparable concretes with cement as the sole binder. In this case the situation is analogous to that of autoclave curing.

Examples of regular iron oxide mortars, pumpable iron oxide mortars and plastic and prepacked concretes with iron oxide mortars serving as binder-matrix, are given hereinafter. Example I may be regarded as a standard for purposes of comparison.

Comparison of Examples I and II, for example, shows the increase in density and more marked increase in compressive strength resulting from the use of Lomar D water reducer. The water-cement ratio was reduced by 17 percent. The adding of PD-1 defoamer increased density and strength further (see Example II).

In Example IV, which contained a water reducer and a defoamer, the cement content was 15 percent less than in Example I but density and strength were higher in Example IV.

Comparison of Examples VII and VIII shows the effectiveness of adding tributyl phosphate defoamer in reducing air content from 8.2 to 2.5 percent in pumpable iron oxide mortars also containing water reducer and thickener admixtures. Example IX is similar to Example VIII but contains fly ash as replacement for 20 percent of the cement of PD-1 defoamer.

Examples X, XI, XII, and XIII are heavy concretes based on cement-fly ash-iron oxide mortars containing functional water reducers and (except in Example X) defoamers. Trap rock, quartz, magnetite, and steel punchings are the coarse aggregates. Example XII was not particularly high in density (190 lb/cu ft) but shows the combined effect of iron oxide mortar and a natural mineral high in thermal conductivity (quartz) in yielding a concrete with thermal conductivity of 32, about three times that of sand-gravel concrete.

Data for prepacked concretes show the high coarse aggregate loading, about 60 percent of the volume of the concrete, attainable by the prepacked method. Fluid cement-fly-ash-iron oxide mortars serve as grouts which are injected under pressure to fill all voids between coarse aggregate particles. Low cement-fly-ash binder contents are achieved. "Air" contents of 3 to 4 percent are due to incorporation of 20 to 40 grams of aluminum powder gas-forming agent per cu. yd. of concrete. Reynolds 3XD and Alcoa 606 are among the many suitable aluminum powders for this purpose. Aluminum reacts with alkalies in the cement to generate hydrogen gas within the matrix and to place the system under mild internal pressure to compensate for initial autogenous shrinkage prior to setting and to provide positive contact between mortar and coarse aggregate. Highest densities are achieved by the prepacked method when heavy coarse aggregates are used.

The above-mentioned examples show the qualities of mortar and concrete that can be attained but do not represent the scope or limitations of mix formulation and properties attainable. Various admixtures and fine and coarse aggregates can be used, substituting aggregates, volume for volume. The ranges of admixture dosage are as follows, based on weight of cementitious materials:

(a) Functional water reducer, 0.2 to 2 percent of cementitious binder content, weight/weight of active admixture solids.
(b) Defoamers, 0.01 to 2 percent, weight/weight.
(c) Thickeners, 0.01 to 2 percent, weight/weight.
(d) Gas-forming agent, 5 to 100 g per cu yd of mortar or concrete.

In the following Examples, quantities of materials are expressed in pounds per cubic yard.

EXAMPLE I

This example is made with 1036 parts of portland cement, type I and 4145 parts of hematite, No. 8 to 0. Four-hundred and thirty-five parts of water are added.

A compressive strength, twenty-eight days, is attained of the magnitude of 5200 psi. A compressive strength after 180 days is attained by 7700 psi.

The density (fresh) is 208 lb./cu. ft. Five and one-half percent of air is included. The thermal conductivity factor k in Btu/hr ft$^2$ (deg F./in.) is 20.

This example constitutes a standard against which the following examples will be compared.

EXAMPLE 2

This example is made with 1073 parts of portland cement, type I and 4298 parts of hematite, No. 8 to 0. Lomar D is also added in the amount of 8.0 parts. Three-Hundred and seventy-six parts of water are added.

A compressive strength, twenty-eight days, is attained of the magnitude of 10500 psi. A compressive strength after 180 days is attained of 11750 psi.

The density (fresh) is 213 lb./cu. ft. Six percent of air is included.

EXAMPLE 3

This example is made with 1101 parts of portland cement, type I and 4405 parts of hematite, No. 8 to 0. Lomar D is also added in the amount of 8.2 parts. Three-Hundred and eighty-five parts of water are added, and 1.6 parts of Nopco PD-1 are also added.

A compressive strength, twenty-eight days, is attained of the magnitude of 10075 psi. A compressive strength after 180 days is attained of 13100 psi.

The density (fresh) is 219 lb./cu. ft. Three and one-half percent of air is included. The thermal conductivity factor k in Btu/hr ft$^2$ (deg F./in.) is 22.

EXAMPLE 4

This example is made with 876 parts of portland cement, type I and 4672 parts of hematite, No. 8 to 0. Sikament is added in the amount of 8.8 parts, and Nopco PD-1 is added in the amount of 1.7 parts. Four-hundred and nine parts of water are added.

A compressive strength, twenty-eight days, is attained of the magnitude of 6500 psi. A compressive strength after 180 days is attained of 8100 psi.

The density (fresh) is 221 lb./cu. ft. Three percent of air is included. The thermal conductivity factor k in Btu/hr ft$^2$ (deg F./in.) is 18.

EXAMPLE V

This example is made with 553 parts of portland cement, type I and 726 parts of magnetite, No. 100 to 0 and 4425 parts of hematite, No. 8 to 0. Lomar D is added in the amount of 8.5 parts. Three-hundred and fifty-four parts of water are added.

A compressive strength, twenty-eight days, is attained of the magnitude of 3700 psi. A compressive strength after 180 days is attained of 6200 psi.

The density (fresh) is 225 lb./cu. ft. Five percent of air is included.

EXAMPLE VI

This example is made with 643 parts of portland cement, type II, 292 parts of fly ash, P-SB, 2497 parts of hematite, No. 8 to 0 and 2264 parts of magnetite, ¼ in.-No. 8. Water-reducer, FX-32, is also included in the amount of 4.7 parts, and 1.0 parts of Nopco PD-1 is also added. Three-hundred and sixty-five parts of water are added.

A compressive strength, twenty-eight days, is attained of the magnitude of 11250 psi. A compressive strength after 180 days is attained of 12200 psi.

The density (fresh) is 225 lb./cu. ft. Two percent of air is included.

EXAMPLE VII

This example is made with 958 parts of portland cement, type I and 3831 parts of hematite, No. 8 to 0.

Lomar D is added in the amount of 4.8 parts and 1.2 parts of Natrosol 250 Hr are also added. Four-hundred and seventy-one parts of water are added.

A compressive strength, twenty-eight days, is attained of the magnitude of 5700 psi. A compressive strength after 180 days is attained of 8200 psi.

The density (fresh) is 195 lb./cu/ft. Air is included in the amount of 8.2 percent.

EXAMPLE VIII

This example is made with 1058 parts of portland cement, type I and 4230 parts of hematite, No. 8 to 0. The water-reducer, FX-32, is added in the amount of 5.2 parts. Cyanamer P-250 is added in the amount of 2.0 parts. Tributyl phosphate is added in the amount of 1.0 part. Four-hundred and fifty-five parts of water are added.

A compressive strength, twenty-eight days, is attained of the magnitude of 8000 psi. A compressive strength after 180 days is attained of 9750 psi.

The density (fresh) is 213 lb./cu. ft. Two and one-half percent of air is included. The thermal conductivity factor k in Btu/hr ft$^2$ (deg F./in.) is 22.

EXAMPLE IX

This example is made with 832 parts of portland cement, type I, 208 parts of fly ash, TVA-B and 4160 parts of hematite, No. 8 to 0. Lomar D is added in the amount of 5.5 parts and 2.5 parts of Natrosol HR are added. Nopco PD-1 is added in the amount of 1.5 parts. Four-hundred and sixty parts of water are added.

A compressive strength, twenty-eight days, is attained of the magnitude of 7600 psi. A compressive strength after 180 days is attained of 10100 psi.

The density (fresh) is 210 lb./cu. ft. Two and one-half percent of air is included.

EXAMPLE X

This example is made with 517 parts of portland cement, type II and 258 parts of Fly ash, C-B. Hematite, No. 8 to 0 is added in the amount of 3335 parts and 1292 parts of trap rock, ⅛ in.-No. 4 is also added. Lomar D is added in the amount of 5.8 and 262 parts of water are added.

A compressive strength, twenty-eight days, is attained of the magnitude of 5715 psi. A compressive strength after 180 days is attained of 9450 psi.

The density (fresh) is 210 lb./cu. ft. Two percent of air is included.

EXAMPLE XI

This example is made with 502 parts of portland cement, type I and 250 parts of Fly ash, TVA-B. Hematite, No. 8 to 0 is added in the amount of 3008 parts and magnetite, ⅜-⅝ in. is added in the amount of 2343 parts. Four and one-half parts of Lomar D are added, and one and one-half parts of Nopco PD-1 are added. Two-hundred and sixty-three parts of water are added.

A compressive strength, twenty-eight days, is attained of the magnitude of 5900 psi. A compressive strength after 180 days is attained of 9705 psi.

The density (fresh) is 236 lb./cu. ft. 1.7 percent of air is included.

EXAMPLE XII

This example is made with 501 parts of portland cement, type II and 249 parts of Fly ash, C-B. Hematite, No. 8 to 0 is added in the amount of 2295 parts, and quartz, ⅜ in.-No. 4 is added in the amount of 1837 parts. Lomar D is added in the amount of 4.5 parts and tributyl phosphate is also added in the amount of 1.1 parts. Two-hundred and sixty parts of water are added.

A compressive strength, twenty-eight days, is attained of the magnitude of 6300 psi. A compressive strength after 180 days is attained of 10250 psi.

The density (fresh) is 190 lb./cu. ft. One-half percent of air is included. The thermal conductivity factor k in Btu/hr ft$^2$ (deg F./in.) is 32.

EXAMPLE XIII

This example is made with 502 parts of portland cement, type II and 250 parts of fly ash, TVA-B. Hematite, No. 8 to 0 is added in the amount of 2553 parts and steel, 1 in.-No. 4 is added in the amount of 4985 parts. The water-reducer, FX-32 is also added in the amount of five parts, and the defoamer, Nopco PD-1 is added in the amount of one and one-half parts. Two-hundred and sixty parts of water are added.

A compressive strength, twenty-eight days, is attained of the magnitude of 5850 psi. A compressive strength after 180 days is attained of 9900 psi.

The density (fresh) is 317 lb./cu. ft. Air is added in the amount of 0.6 percent. The thermal conductivity factor k in Btu/hr ft$^2$ (deg F./in.) is 52.

EXAMPLE XIV

This example is made with 263 parts of portland cement, type II and 133 parts of fly ash, TVA-B. Hematite, No. 8 to 0 is added in the amount of 1460 parts, and magnetite, ⅜-⅝ in. is also added in the amount of 4500 parts. Lomar D is added in the amount of 2.6 parts with also the addition of 0.5 parts of Natrosol HR. Nopco PD-1 is added in the amount of 0.8 parts and 175 parts of water are also added.

A compressive strength, twenty-eight days, is attained of the magnitude of 3200 psi. A compressive strength after 180 days is attained of 5500 psi.

The density (fresh) is 242 lb./cu. ft. Four percent of air is included.

EXAMPLE XV

This example is made with 265 parts of portland cement, type II and 135 parts of fly ash, TVA-B. Hematite, No. 8 to 0 is added in the amount of 1468 parts and quartz, 1⅜ in. is added in the amount of 2650 parts. Lomar D is added in the amount of 2.5 parts with the addition of 0.5 parts of Natrosol HR. Nopco PD-1 is added in the amount of 0.8 parts and 180 parts of water are also added.

A compressive strength, twenty-eight days, is attained of the magnitude of 3500 psi. A compressive strength after 180 days is attained of 5750 psi.

The density (fresh) is 174 lb./cu. ft. Three percent of air is included. The thermal conductivity factor k in Btu/hr ft$^2$ (deg F./in.) is 37.

EXAMPLE XVI

This example is made with 301 parts of portland cement, type II and 100 parts of fly ash, TVA-B. Hematite, No. 8 to 0 is added in the amount of 1475 parts and 7850 parts of steel, 1½ in. are also added. Lomar D is added in the amount of 3.0 parts with the addition of 1.0 parts of Natrosol HR. Nopco PD-1 is added in the amount of 0.5 parts and 170 parts of water are also added.

A compressive strength, twenty-eight days, is attained of the magnitude of 3600 psi. A compressive strength after 180 days is attained of 5600 psi.

The density (fresh) is 366 lb./cu. ft. Three percent of air is included. The thermal conductivity factor k in Btu/hr ft$^2$ (deg F./in.) is 72.

In the above, examples I–VI are iron oxide mortars. Examples VII–IX are pumpable iron oxide mortars. Examples X–XIII are plastic concretes with iron oxide mortar matrices.

Examples XIV–XV are prepacked concretes with iron oxide mortar matrices. There will now be obvious to those skilled in the art many modifications and variations of the examples given hereinabove. These modifications and variations will not depart from the scope of the invention if defined by the following claims:

What is claimed is:

1. A mortar or cement composition adapted for being mixed with water and set, said composition comprising cement, iron oxide, a functional water reducer admixture, and a thickener admixture, said functional water reducer admixture being adapted to increase the density of the mortar or cement without substantially retarding the setting thereof and without entraining substantial amounts of air, said thickener admixture being adapted to inhibit bleeding of water from the mortar or cement.

2. A composition as claimed in claim 1 comprising a defoamer admixture to reduce air content of the mortar or concrete and increase density thereof.

3. A composition as claimed in claim 1 wherein the iron oxide is fine aggregate and further comprising coarse aggregate.

4. A composition as claimed in claim 1 wherein the iron oxide is present in a ratio of about 4:1 by weight relative to the cement.

5. A composition as claimed in claim 1 wherein the functional water reducer is present in the amount of about 0.2 to 2 percent of the cement by weight.

6. A composition as claimed in claim 2 wherein the defoamer admixture is present in the amount of about 0.01 to 2 percent of the cement by weight.

7. A composition as claimed in claim 1 wherein the thickener admixture is present in the amount of about 0.01 to 2 percent of the cement by weight.

8. A composition as claimed in claim 1 further comprising a gas forming agent in an amount of about 5 to 100 g. per cu. yd. of mortar or concrete.

9. A composition as claimed in claim 1 further comprising fly ash.

10. A composition as claimed in claim 1 wherein the functional water reducer admixture is a water soluble polymer of high molecular weight.

11. A composition as claimed in claim 1 wherein the functional water reducer admixture is a formaldehyde condensed salt of beta naphthalene sulfonic acid or melamine sulfonic acid.

12. A composition as claimed in claim 2 wherein the defoamer admixture is tributyl phosphate.

13. A composition as claimed in claim 2 wherein the defoamer admixture is a silicone based defoamer.

14. A composition as claimed in claim 2 wherein the defoamer admixture is selected from the group consisting of dibutyl phthalate, water-insoluble alcohols, and water-insoluble esters of carbonic and boric acids.

15. A composition as claimed in claim 1 wherein the thickener admixture is selected from the group consisting of soluble cellulose gums, polyethylene oxide, polyacrylamides, guar gum, montmorillonites, bentonite clay, pyrogenic silica, asbestos, mineral fillers and fibers.

16. A composition as claimed in claim 1 wherein the cement is portland cement.

17. A composition as claimed in claim 1 wherein the iron oxide is hematite or magnetite.

18. A composition as claimed in claim 1 further comprising at least one finely divided mineral admixture.

19. A composition as claimed in claim 2 wherein the iron oxide is fine aggregate and further comprising coarse aggregate.

20. A composition as claimed in claim 2 wherein the iron oxide is present in a ratio of about 4:1 by weight relative to the cement.

21. A composition as claimed in claim 2 wherein the functional water reducer is present in the amount of about 0.2 to 2 percent of the cement by weight.

22. A composition as claimed in claim 2 wherein the defoamer admixture is present in the amount of about 0.01 to 2 percent of the cement by weight.

23. A composition as claimed in claim 2 wherein the thickener admixture is present in the amount of about 0.01 to 2 percent of the cement by weight.

24. A composition as claimed in claim 2 further comprising a gas forming agent in an amount of about 5 to 100 g. per cu. yd. of mortar or concrete.

25. A composition as claimed in claim 2 further comprising fly ash.

26. A composition as claimed in claim 2 wherein the functional water reducer admixture is a water soluble polymer of high molecular weight.

27. A composition as claimed in claim 2 wherein the functional water reducer admixture is a formaldehyde condensed salt of beta naphthalene sulformic acid or melamine sulfonic acid.

28. A composition as claimed in claim 2 wherein the defoamer admixture is tributyl phosphate.

29. A composition as claimed in claim 2 wherein the defoamer admixture is a silicone based defoamer.

30. A composition as claimed in claim 2 wherein the defoamer admixture is selected from the group consisting of dibutyl phthalate, water-insoluble alcohols, and water-insoluble esters of carbonic and boric acids.

31. A composition as claimed in claim 2 wherein the thickener admixture is selected from the group consisting of soluble cellulose gums, polyethylene oxide, polyacrylamides, guar gum, montmorillonites, bentonite clay, pyrogenic silica, asbestos, mineral fillers and fibers.

32. A composition as claimed in claim 2 wherein the cement is portland cement.

33. A composition as claimed in claim 2 wherein the iron oxide is hematite or magnetite.

34. A composition as claimed in claim 2 further comprising at least one finely divided mineral admixture.

35. A composition as claimed in claim 1 further comprising a gas forming agent in an amount of about 5 to 100 g. per cu. yd. of mortar or concrete.

36. A method of making a mortar or cement composition comprising adding to cement and iron oxide a functional water reducer admixture and thickener admixture, the functional-water-reducer admixture being added selectively to increase the density of the mortar or cement, and the thickener admixture being added selectively to inhibit bleeding of water from the mortar or cement.

37. A method as claimed in claim 36 comprising a defoamer admixture to reduce the air content of the cement or mortar.

38. A method as claimed in claim 37 wherein the thickener admixture is added to enhance pumpability of the mortar or cement and the defoamer admixture is used to compensate for air entrained by the thickener admixture.

39. A method as claimed in claim 37 wherein the ratio of cement to iron oxide is reduced dependent on the presence of admixtures to maintain strength.

40. A method as claimed in claim 37 comprising adding coarse aggregate of high density or high thermal conductivity characteristics.

41. A method as claimed in claim 37 comprising substituting fly ash for cement in an amount dependent on temperature and length of curing of the cement or mortar.

42. A method as claimed in claim 37 wherein the iron oxide is added as fine aggregate, comprising further adding coarse aggregate.

43. A method as claimed in claim 37 wherein the iron oxide is added in a ratio of about 4:1 by weight relative to the cement.

44. A method as claimed in claim 37 wherein the functional water reducer is added in the amount of about 0.2 to 2 percent of the cement by weight.

45. A method as claimed in claim 37 wherein the defoamer admixture is added in the amount of about 0.01 to 2 percent of the cement by weight.

46. A method as claimed in claim 37 wherein the thickener admixture is added in the amount of about 0.01 to 2 percent of the cement by weight.

47. A method as claimed in claim 37 wherein a gas forming agent is added in an amount of about 5 to 100 g. per cu. yd. of mortar or concrete.

48. A method as claimed in claim 37 wherein fly ash is further added.

49. A method as claimed in claim 37 wherein the functional water reducer admixture is added in the form of a water soluble polymer of high molecular weight.

50. A method as claimed in claim 37 wherein the functional water reducer admixture is added in the form of a formaldehyde condensed salt of beta naphthalene sulfonic acid or melamine sulfonic acid.

51. A method as claimed im claim 37 wherein the defoamer admixture is added in the form of tributyl phosphate.

52. A method as claimed in claim 37 wherein the defoamer admixture is added in the form of a silicone based defoamer.

53. A method as claimed in claim 37 wherein the defoamer admixture is added from the group consisting of dibutyl phthalate, water-insoluble alcohols, and water-insoluble esters of carbonic and boric acids.

54. A method as claimed in claim 37 wherein the thickener admixture is added from the group consisting of soluble cellulose gums, polyethylene oxide, polyacrylamides, guar gum, montmorillonites, bentonite clay, pyrogenic silica, asbestos, mineral fillers and fibers.

55. A method as claimed in claim 37 wherein the cement is added in the form of portland cement.

56. A method as claimed in claim 37 wherein the iron oxide is added in the form of hematite or magnetite.

57. A method as claimed in claim 37 wherein one finely divided mineral admixture is further added.

* * * * *